April 14, 1964   J. H. PAYNE, JR   3,128,561
WHEEL ALIGNMENT GAGE
Filed Oct. 19, 1960
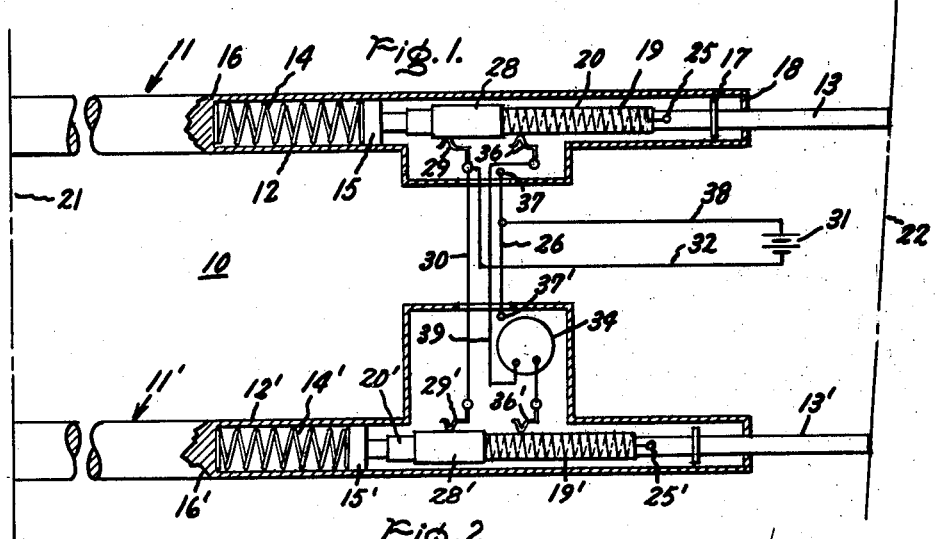
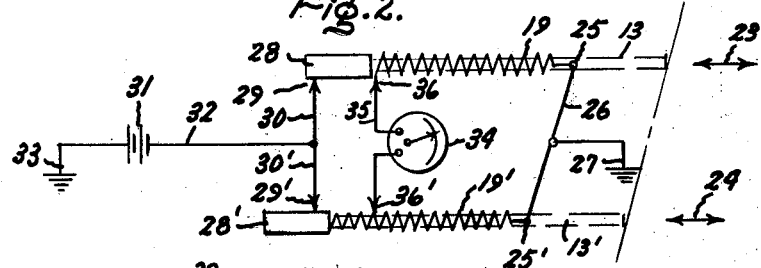
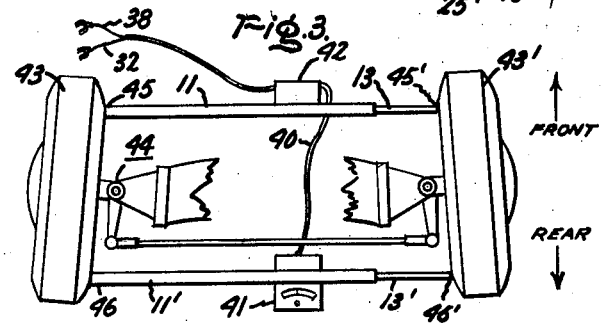
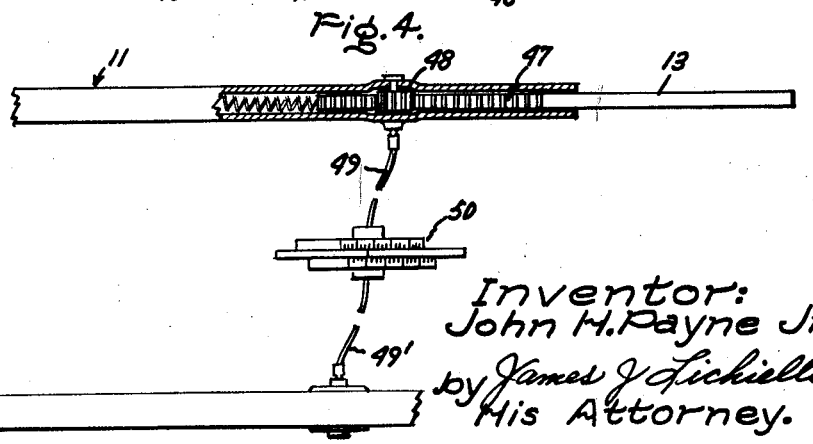
Inventor:
John H. Payne Jr.,
by James J. Lichiello
His Attorney.

United States Patent Office 3,128,561
Patented Apr. 14, 1964

3,128,561
WHEEL ALIGNMENT GAGE
John H. Payne, Jr., 79 West St., Ballston Spa, N.Y.
Filed Oct. 19, 1960, Ser. No. 63,665
4 Claims. (Cl. 33—203.2)

This invention relates to a gage to obtain comparative measurements and, more particularly, to a gage employed to indicate alignment of dirigible or steering wheels, for example, those front wheels associated with automotive and other type vehicles.

One of the more important measurements needed in order to properly align the steering running wheels of automotive and other such vehicles is "toe in". "Toe in" may be defined as the angle between the plane of a steering wheel in the straight ahead or forward position and a plane of the wheel in a position to converge upon a predetermined central point. In other words, in automotive steering wheels, the planes of the wheels are not set in a straight-forward position, but to the contrary, converge slightly towards each other. This slight angle is necessary because of the steering geometry, loading, and other characteristics relating to automotive vehicles. In practice, "toe in" is a linear measurement and is generally less than one quarter of an inch, and usually about one eighth of an inch, per wheel diameter.

Prior gages employed for the measure of "toe in" inherently contain various disadvantages. These gages, in the first instance, may represent a substantial investment and/or require a skilled operator for their proper use. Other prior gages may require motion of the vehicle during checking or adjustment. It is obvious, therefore, that considerable effort or apparatus must be utilized to move the vehicle, or the engine of the vehicle is operated in generally closed areas, such as garages and the like, with danger of exhaust gases involved. Such movement also affects the accuracy of measurement due to alignment, lost motion, leveling, etc. Another obvious disadvantage is that these gages require a series of reading and adjusting processes so that the operator consumes extensive time in, for example, moving the car and reading the gage, returning underneath the car for adjustment, and a repetition of these steps until the required adjustment is made.

Accordingly, it is an object of this invention to provide an improved comparative reading gage.

It is another object of this invention to provide an improved "toe in" gage.

It is yet another object of this invention to provide an improved "toe in" gage not requiring motion of the vehicle.

It is still another object of this invention to provide an accurate electrical indicating "toe in" gage.

It is a further object of this invention to provide a comparative reading electrical gage to indicate "toe in" of a pair of wheels simultaneously.

Briefly described, this invention includes a first member or means to obtain an indication of the distance between opposite lateral points on a pair of objects or wheels and a second member or means to obtain an indication of the distance between additional opposite lateral points between said pair of objects or wheels. At the same time both distances or indications are integrated to provide a single reading or signal indicating parallelism, i.e., toe in or angularity of the wheels or objects.

This invention will be better understood when taken in connection with the following description and drawings in which:

FIG. 1 is an illustration of a preferred embodiment of this invention;

FIG. 2 is a schematic illustration of the electrical circuit employed with this invention;

FIG. 3 is a plan view of the gage in operative position for measuring toe in between the automotive steering wheels; and FIG. 4 is a mechanical modification of this invention.

One preferred working embodiment of this invention is illustrated in FIG. 1. Referring now to FIG. 1, toe in gage 10 includes a pair of extensible members 11 and 11'. The extensible or telescopic arrangement for each member 11 and 11' being similar, a description of one suffices for the other. Member 11 comprises a hollow tube-like element 12 incorporating a telescopic or extensible rod 13. While various means are available to provide extensibility, a preferred form includes biasing means in the form of a spring 14. Spring 14 bears against a suitable stop 16 on element 12 and a suitable surface 15 on rod 13. Biasing of rod 13 outwardly from element 12 is limited by a projection 17 on rod 13 engaging an end portion 18 on element 12. It is thus understood that mechanical movement is provided since rod 13 may be moved inwardly to compress spring 14 to take up various positions relative to element 12.

Since each extensible rod 13 and 13' is adapted for mechanical movement, means are provided to transform this mechanical movement to an electrical impulse or signal. Such means includes an electrical resistance coil 19 and 19' wound about each rod 13 and 13' and electrically insulated therefrom by insulation 20. By means of these electrical resistance coils a signal or impulse is established to determine the position of rods 13 and 13' relative to each other or more descriptively, the length of each rod 13 and 13' as projecting from its respective element 12 and 12'. The projecting length of each rod 13 and 13' may differ, for example, when the apparatus is placed between two planes which are not parallel, as illustrated by the dash lines 21 and 22 of FIG. 1. The electrical means or circuitry is more clearly described first with respect to FIG. 2.

Referring now to FIG. 2, there is illustrated a schematic representation of a preferred form of electric circuit employed in this invention. This circuit represents a form of the familiar and well known "Wheatstone bridge circuit" and is described in relation to this invention as follows. Coils 19 and 19' represent those coils of FIG. 1 wound about, and insulated from rods 13 and 13' which may move as indicated by arrows 23 and 24. These coils are connected together at ends 25 and 25' by means of electrical lead 26 and are in turn connected to ground 27. The other ends of coils 19 and 19' are connected to a pair of electrically conducting tubes 28 and 28' of metal, for example, copper, which are also insulated from rods 13 and 13' by insulation 20. Tubes 28 and 28' are then electrically connected together by means of sliding conductors or brushes 29 and 29' and leads 30 and 30'. At the same time, leads 30 and 30' are also connected to a suitable source of power, for example, battery 31 by lead 32. Battery 31 is then connected to ground at 33. An electrical indicating means, meter 34, for example, a voltmeter, ammeter, etc. is connected by means of lead 35 and a sliding conductor 36 to an intermediate portion of coil 19, and by the same means, a lead 35' and sliding conductor 36' contacts coil 19' intermediate its ends.

Operation of this circuit with respect to this invention is as follows. For example, one rod 13 may move its coil 19 to the right, as illustrated. Current flow is then, in one direction, from battery 31 through lead 32, divides and flows through leads 30 and 30', sliding conductors 29 and 29' and through coils 19 and 19'. Upon inspection of FIG. 2, it is understood that meter 34, a voltmeter for example, will indicate the potential difference between sliding connectors 36 and 36'. Electrically conducting sleeves or tubes 28 and 28' are employed as a simple expedient to bring out the connections of coils 19 and 19' to the source of power. They also serve to maintain a constant potential over their surface of traversal by sliding conductors 29 and 29'. In one preferred embodiment of this invention sleeves 28 and 28' are of copper and about 3 inches in length. Coils 19 and 19' are also about 3 inches in length and are wound with a potential of 4 volts per inch, thereby totaling 12 volts per coil. By this means where a reading of one volt is equivalent to ¼ of an inch of travel or telescoping, an inexpensive voltmeter may be employed with scale readings linear, with excellent spacing and with increased accuracy. Meter 34 then includes a suitable scale so that needle deflection indicates the degree that one coil is displaced relative to the other. It is understood, however, that various indicator means, for example, audio, visual, and other electrical gages may be employed. Operation as described is similar for displacement or telescoping of either coil.

The circuit as described is employed with the structure of FIG. 1 and correlated as follows. Referring again to FIG. 1, each coil 19 and 19' is connected to its respective rod element 13 and 13' at 25 and 25'. Connections 37 and 37' become the same connections as 25 and 25' through the metal casing of elements 12 and 12'. Connections 37 and 37' are essentially the same as the ends of coils 19 and 19' and are connected together by means of lead 26. Thereafter lead 26 is connected to one side of battery 31 by lead 38. In this instance, battery 31 may be included in the apparatus or separate therefrom, for example, the ordinary power supply or battery of an automotive vehicle. Sleeves or tubes 28 and 28' of coils 19 and 19' are connected together by means of sliding conductors 29 and 29' and lead 30. Meter 34 is connected across coils 19 and 19' intermediate their ends by means of sliding conductors 36 and 36' and lead 39. The other connection for battery 31 is by means of lead 32 to lead 30 at sliding connector 29. It can thus be understood that the circuit of FIG. 2 and its operation is incorporated in the structure of FIG. 1.

This invention accordingly provides, in the first instance, electrical indicating means to indicate parallelism or angular relationship of two spaced apart objects. An electrical signal is provided between one point on one object and an opposite point on the other object. A second electrical signal is provided between a second pair of similar points but spaced from the first. Means are provided to integrate the two signals to provide one signal indicating parallelism relationship.

This invention is more particularly adaptable to indicate "toe in" of automotive type vehicles as illustrated in FIG. 3. Referring now to FIG. 3, in one operative embodiment of this invention, the electrical leads extending between members 11 and 11' are included in one composite lead 40. Meter 34 or other suitable indicator is included within a suitable housing 41 which is attached to one member 11'. Furthermore, where a battery supply is employed as a part of the structure, the battery may be included in a suitable housing 42 attached to the other member 11. The toe in operation of this invention is best described as follows. FIG. 3 illustrates a pair of automotive-type steering wheels 43 and 43' together with an axle and steering mechanism 44. The gage of this invention is positioned with one member 11 between and engaging a pair of positions or points 45 and 45' at the forward portion of the wheels which are generally parallel to a floor surface, for example. These positions may be on the wheel rim itself or may be against the tire casing. The other member 11' is placed at a similar position and between similar points 46 and 46' at the rear of the wheels. It is assumed that when rods 13 and 13' are extended equally from their respective tube elements, that the indicator is set or positioned on a zero reading. Thereafter, the scale for the meter is suitably calibrated to read "toe in" on one side of zero in inches, for example, and "toe out" on the other side of zero in inches, the inches being correlated to volts as described. After positioning the gage of this invention between the wheels as described, leads 38 and 32 are connected, when a power source is not provided in the gage, to a suitable power source, for example, the battery of the automobile as illustrated in FIG. 1. It can be seen in the exaggerated figure of FIG. 3 that rod 13' is extended far more than rod 13 so that in conjunction with the description given for the circuitry of FIG. 2, it is obvious that because of potential difference between the coils, meter 34 will indicate a deflection. The amount of the deflection indicates the amount of "toe in." As can be seen by this plan view, it becomes a simple matter then for the operator to make any and all repetitive adjustments in one position with recourse to the gage means in its proper locale, and with no motion of the wheels required. Thus, in one quick simple operation "toe in" is accurately measured and quickly adjusted.

This invention is also applicable to a mechanical counterpart as illustrated in FIG. 4. Referring now to FIG. 4, there is shown a schematic modification of this invention adapted for mechanical usage. In FIG. 4, rods 13 and 13' include ratchet teeth 47 thereon. Ratchet teeth 47 engage suitable gears 48 which are attached to the tubular members 11 and 11' to be rotated about their respective axes. Each gear 48 has attached thereto a suitable shaft or flexible cable 49 connected to an indicating instrument 50. Various means are well known in the prior art to integrate the rotation of these shafts or cables to provide a single reading dependent upon the relative projections of rods 13 from their tube elements 11. For example, each flexible shaft 49 and 49' could be connected to suitable scale members 51 and 51' so that opposite rotation of shaft members 49 and 49' will provide an opposite deflection on motion of one scale with respect to the other. The different motion together with an appropriate scale may then be considered as an integrating mechanism. Such integrating mechanisms being very common and well known in the prior art, it is not considered an important feature of this modification of the invention.

It is obvious to those skilled in the art that various adjusting means may be employed to shorten or lengthen the telescopic tube arrangement for various tread dimensions for different type vehicles.

While other modifications of this invention and variations of apparatus which may be employed within the scope of this invention have not been described, the invention is intended to include all such as may be embraced within the following claims.

What I claim as new and desire to secure by Letters Patent of the United States is:

1. A "toe in" gage measuring device to measure "toe in" in automotive type steering wheels comprising in combination,
    (a) a first extensible member to be placed between and engage said wheels at a pair of lateral points at a forward position thereof,
    (b) a second extensible member to be placed between and engage said wheels at a pair of lateral points at a rearward position thereof,
    (c) first indicating means operatively connected to said first extensible member to provide an indication of the extension thereof between said wheels,
    (d) second indicating means operatively connected to said second extensible means to provide an indication of the extension thereof between said wheels, and
    (e) integrating means operatively connected to each of said extensible members to integrate said indications of extension to provide a single indication of the relative angular relationship of said wheels to each other.

2. A "toe in" gage measuring device to measure "toe in" in automotive type steering wheels comprising in combination, a first extensible member to be placed between said wheels at a forward position, a second extensible member adapted to be placed between said wheels at a rearward location, a first electrical resistance coil directly connected to said first extensible means, a second electrical resistance coil directly connected to said second extensible means, electrical conductor means to connect said first and said second electrical resistance coils to a source of power, sliding conductor means engaging said coils to measure the potential difference therebetween depending on the angular relationship of said wheels to each other, and integrating electrical gage means connected to said sliding conductor means to provide a signal indicating the angular relationship of said wheels to each other.

3. A "toe in" gage measuring device to measure "toe in" in automotive type steering wheels comprising in combination, a first tube and rod adapted for telescopic movement, a first electrical coil wound about said rod, a second tube and rod assembly adapted for telescopic movement, a second electrical coil wrapped about said second rod, sliding conductor means connecting one end of each coil to a source of power, means connecting the other end of each coil to ground, a sliding conductor intermediate the end of said first coil, a sliding conductor intermediate the end of said second coil, a voltmeter connected to each of said latter sliding conductors so that uneven displacement of said rods in said tubes when placed between the wheels of an automotive vehicle changes the potential difference in said coils to provide an indication on said voltmeter indicating the angular relationship of said wheels.

4. A "toe in" measuring gage to measure "toe in" in automotive type steering wheels comprising in combination a first tube and rod adapted for telescopic movement, means biasing said rod outwardly from said tube, a second tube and rod adapted for telescopic movement, means biasing said second rod outwardly from said second tube, a first electrical resistance coil insulated from and wound about said first tube, a second electrical resistance coil insulated from and wound about said second rod, a first pair of sliding conductor means engaging a first similar end portion of each of said coils to be connected to a source of electrical power, connecting means connecting the other end portions of said coils to said source of power to couple an electrical circuit through said coils, a second pair of sliding conductor means each engaging its respective coil between said first sliding conductor means and said connecting means, an electrical measuring device connected across said second sliding conductor means so that when one of said coils is displaced telescopically relative to the other when said telescopic tubes and rods are placed between the steering wheels of an automotive vehicle, said electrical measuring device provides a measurement correlated to "toe in."

References Cited in the file of this patent

UNITED STATES PATENTS

| 1,688,330 | Gunther et al. | Oct. 23, 1928 |

FOREIGN PATENTS

| 630,173 | Germany | May 22, 1936 |
| 490,793 | Italy | Feb. 16, 1954 |